(12) United States Patent
Cui et al.

(10) Patent No.: US 11,777,093 B2
(45) Date of Patent: Oct. 3, 2023

(54) POLYMER BINDER WITH HIGH PEEL STRENGTH AND APPLICATION THEREOF IN SECONDARY LITHIUM BATTERY

(71) Applicant: QINGDAO INSTITUTE OF BIOENERGY AND BIOPROCESS TECHNOLOGY, CHINESE ACADEMY OF SCIENCES, Shandong (CN)

(72) Inventors: Guanglei Cui, Shandong (CN); Huanrui Zhang, Shandong (CN); Peng Wang, Shandong (CN); Hongxia Xu, Shandong (CN); Rongxiang Hu, Shandong (CN)

(73) Assignee: QINGDAO INSTITUTE OF BIOENERGY AND BIOPROCESS TECHNOLOGY, CHINESE ACADEMY OF SCIENCES, Shandong (CN)

( * ) Notice: Subject to any disclaimer, the term of this patent is extended or adjusted under 35 U.S.C. 154(b) by 361 days.

(21) Appl. No.: 17/059,421

(22) PCT Filed: Feb. 12, 2020

(86) PCT No.: PCT/CN2020/074827
§ 371 (c)(1),
(2) Date: Nov. 27, 2020

(87) PCT Pub. No.: WO2021/042671
PCT Pub. Date: Mar. 11, 2021

(65) Prior Publication Data
US 2022/0238881 A1    Jul. 28, 2022

(30) Foreign Application Priority Data
Sep. 4, 2019   (CN) .......................... 201910830990.4

(51) Int. Cl.
H01M 4/62   (2006.01)
H01M 4/04   (2006.01)
H01M 10/0525   (2010.01)

(52) U.S. Cl.
CPC ......... *H01M 4/622* (2013.01); *H01M 4/0404* (2013.01); *H01M 10/0525* (2013.01)

(58) Field of Classification Search
CPC ............... H01M 4/622; H01M 4/0404; H01M 10/0525; H01M 10/052; H01M 4/0409; H01M 4/13; H01M 4/139
See application file for complete search history.

(56) References Cited

U.S. PATENT DOCUMENTS 3,831,609 A   8/1974   Briskin et al.

FOREIGN PATENT DOCUMENTS

CH        636628     *  6/1983
CN     105702919 A      6/2016
(Continued)

OTHER PUBLICATIONS

Ding et al, European Polymer Journal 37(201) 2453-2459. (Year: 2001).*

(Continued)

*Primary Examiner* — Andrew J. Oyer
(74) *Attorney, Agent, or Firm* — NKL Law; Allen Xue (57) ABSTRACT

A polymer binder with high peel strength is used in a secondary lithium battery. The polymer binder is obtained by a ring-opening reaction of polyvinylene carbonate by a nucleophile. The polyvinylene carbonate accounts for 10-90% of the total mass of the polymer binder while the nucleophile accounts for 10-90% of the total mass of the polymer binder. The polymer binder has high peel strength (Continued)

(0.02-0.6 N/mm) and high decomposition voltages (4.5-6.0 V), and can be used as an electrode material binder in a secondary lithium battery.

7 Claims, 3 Drawing Sheets

(56) References Cited

FOREIGN PATENT DOCUMENTS

| | | |
|---|---|---|
| CN | 110504452 A | 11/2019 |
| JP | 2015196738 A * | 11/2015 |

OTHER PUBLICATIONS

English Translation of JP2015196738A (Year: 2015).*
Buqa H. et al.; Study of styrene butadiene rubber and sodium methyl cellulose as binder for negative electrodes in lithium-ion batteries; Journal of Power Sources, 161 (2006) 617-622.
Kovalenko, Igor et al.; A Major Constituent of Brown Algae for Use in High-Capacity Li-Ion Batteries; SCIENCE, vol. 334, Oct. 7, 2011.
Magasinski, Alexandre et al.; Toward Efficient Binders for Li-Ion Battery Si-Based Anodes: Polyacrylic Acid; ACS Applied Materials & Interfaces, vol. 2 No. 11, pp. 3004-3010, Nov. 5, 2010.
Jeong, You Kyeong et al.; Hyperbranched β-Cyclodextrin Polymer as an Effective Multidimensional Binder for Silicon Anodes in Lithium Rechargeable Batteries; American Chemical Society, Nano Letters, 2014, 14, pp. 864-870.
Lee, Jung In et al.; Amphiphilic Graft Copolymers as a Versatile Binder for Various Electrodes of High-Performance Lithium-Ion Batteries; SMALL, vol. 12 No. 23 pp. 3119-3127, Apr. 27, 2016.
Ding, Lunhan et al.; Polymerization of Vinylene Carbonate as well as aminolysis and Hydrolysis of Poly (vinylene Carbonate); European Polymer Journal., vol. 37, No. 12, Dec. 31, 2001, ISSN: 0014-3057, pp. 2453-2459.
Webster, Dean C.; Cyclic Carbonate Functional Polymers and Their Applications; Progress in Organic Coatings., vol. 47, Dec. 31, 2003, ISSN: 0300-8440, pp. 77-86.
Zhao, Hui et al.; A Polymerized Vinylene Carbonate Anode Binder Enhances Performance of Lithium-ion Batteries; Journal of Power Sources; vol. 263, Apr. 24, 2014, ISSN: 0378-7753, pp. 288-295.

* cited by examiner

Fig. 6

POLYMER BINDER WITH HIGH PEEL STRENGTH AND APPLICATION THEREOF IN SECONDARY LITHIUM BATTERY

TECHNICAL FIELD

The present invention relates to the field of secondary lithium batteries, in particular to a polymer binder with high peel strength and an application thereof in a secondary lithium battery.

BACKGROUND

A secondary lithium ion battery has been widely used in novel portable communication and electronic products such as mobile phones and laptops currently due to a series of outstanding advantages such as high specific energy, high working voltage, light weight, low self-discharge, long cycle life, stable discharge, no memory effect and low environmental pollution. In the process of preparing the lithium ion battery, both the cathode slurry and anode slurry are uniformly coated onto a corresponding current collector, and the coated current collector is then dried, rolled, and sheeted for use in the lithium ion battery. The binder is generally an inactive component in an electrode sheet of the secondary lithium battery, and has the main functions of bonding the electrode active material, enhancing the electronic contact of the binder with a conductive agent and the current collector, better stabilizing the structure of the electrode sheet and buffering the volume shrinkage/expansion of the electrode material during charging and discharging. PVDF is nowadays the most commonly used binder for electrodes. However, the PVDF binder exhibits obvious defects: (1) It bonds electrode components and the current collector only through Van der Waals force, causing inadequate adhesion performance and thus electrode delamination and peeling during cycling. (2) It exhibits low ionic conductivities and electronic conductivity, which is easy to cause battery polarization when charging and discharging at high rates. (3) Its mechanical performance (eg. elastic modulus) is poor, and can hardly satisfy the binder requirement of anodes using active materials with great volume change such as nano-silicon material during charging and discharging. (4) It is easy to decompose at high voltages leading to decreased adhesion performance. Therefore, the design and development of a novel high-performance polymer binder is of great significance to the application of the secondary lithium battery with high energy density.

At present, the development of the electrode binder has made some progress. For example, Yang et al. disclosed the preparation and application of a silicon cathode binder polyvinylidene fluoride-g-poly-tert-butyl acrylate (Small 2016, 12, 3119). In this study, this binder can condense with the hydroxyl groups on the surface of a silicon cathode at high temperature of 230° C. to form an ester bond, which enables excellent mechanical performance conductive to buffering the volume expansion of the silicon cathode during charging and discharging. However, this binder requires harsh synthesis conditions and complicated preparation process. Luzinov et al. developed polyacrylic acid as the silicon cathode binder (ACS Applied Materials & Interfaces, 2010, 2, 3004). Here, the binder exhibits a tensile strength of 90 MPa and excellent bonding performance, and the as-prepared silicon/graphite cathode can cycle for 100 cycles at room temperature and 0.5 C-rate and still maintains a specific discharge capacity of more than 2000 mAh/g. However, a polyacrylic acid binder has very low elastic modulus, and cannot accommodate the volume expansion issue of the silicon cathode during cycling, causing more severe side reactions at SEI and fast capacity fade thereof. In addition, the application of polysaccharide type binders receives extensive attention from scientists due to the advantages of extremely rich polar functional groups such as hydroxyl group and carboxyl group (nearly each carbon atom connecting one polar functional group), good biocompatibility, low cost and easy availability. For example, carboxymethyl cellulose (CMC), alginate and cyclodextrin have been applied as the silicon cathode binder, and render excellent cycling stability (J. Power Sources 2006, 161, 617; Science 2011, 334, 75; Nano Lett. 2014, 14, 864). However, most polysaccharide binders suffer from low peel strength from the current collector and insufficient electronic conductivity, and often need to blend with other polymers to achieve better bonding performance. In addition, the polysaccharide binders have the defects of low solubility in organic solvents (alkaline solvents or ionic liquids are required for dissolution) and harsh structure optimization conditions in structural modification, thereby restricting the application potential of them.

In conclusion, the binder has important influence on the electrochemical performance of the secondary lithium battery. The traditional PVDF binder has some defects and cannot satisfy the binder requirement of the secondary lithium battery with high energy. The polysaccharides can be used as the binder in various cathode and anode materials due to the advantage of extremely rich polar functional groups, however, most of them have suffer from low peel strength from the current collector, low solubility in organic solvents and harsh structure optimization conditions.

SUMMARY

The purpose of the present invention is to provide preparation and application of a high-performance binder, i.e., a polymer binder with high peel strength and application thereof in a secondary lithium battery.

To achieve the above purpose, the present invention adopts the following technical solution:

A polymer binder with high peel strength is provided. The polymer binder is obtained by a ring-opening reaction of polyvinylene carbonate by a nucleophile, wherein the polyvinylene carbonate accounts for 10-90% of the total mass of the polymer binder; and the nucleophile accounts for 10-90% of the total mass of the polymer binder.

Preferably, the polyvinylene carbonate accounts for 40-50% of the total mass of the polymer binder; and the nucleophile accounts for 50-60% of the total mass of the polymer binder.

The polymer binder is prepared by the ring-opening reaction of the polyvinylene carbonate by the nucleophile, and has high peel strength (0.02-0.6 N/mm) and high decomposition voltage (4.5-6.0 V).

The polyvinylene carbonate generates the ring-opening reaction by the nucleophile at −10 to 100° C., preferably at 25-50° C.

The nucleophile is one or more of compounds containing amino, hydroxyl or sulfhydryl functional groups.

The nucleophiles is one or more of glucosamine, chitosan, amino acid,

-continued compound, wherein in the above structural formulas of the compounds, the value of n is 1-2, and the value of m is 0-200; X is selected from O, S or NH; Y is selected from $PF_6^-$, $BF_4^-$, $TFSI^-$, $FSI^-$ or $CH_3OSO_3^-$; $R_1$ is selected from H, Me or Et.

Preferably, the nucleophile is amino acid or in the structural formula, the value of n is 1-2, and the value of m is 0-200; X is selected from O, S or NH.

An application of a polymer binder with high peel strength and an application of a polymer binder in preparation of an electrode of a secondary lithium battery are provided.

A polymer binder base electrode with high peel strength is provided. The electrode comprises electrode active material, the polymer binder with high peel strength, and a conductive agent, wherein the mass fraction of the electrode active material in the electrode is 50-95%; the mass fraction of the polymer binder with high peel strength in the electrode is 5-25%; and the mass fraction of the conductive agent in the electrode is 5-25%.

Preferably, the mass ratio of the electrode active material in the electrode is 80-90%; the mass ratio of the polymer binder with high peel strength in the electrode is 8-12%; and the mass ratio of the conductive agent in the electrode is 6-12%.

The above electrode active material, the polyvinylene carbonate, the nucleophile and the conductive agent are added to an organic solvent, and uniformly mixed at −10 to 100° C. for 2 min to 2 h to obtain a uniform slurry; the slurry is coated on a conductive current collector by a doctor blade; the coated current collector is dried in an oven at 60° C. for 20 min to 2 h; and then the coated current collector is dried in a vacuum oven at 60-120° C. for 24 h to obtain an electrode sheet.

Or, the polyvinylene carbonate and the nucleophile are dissolved in the organic solvent, and react at −10 to 100° C. for 2 min to 2 h; then, the conductive agent is added and uniformly mixed to obtain a uniform slurry; the slurry is coated on the conductive current collector by the doctor blade; the coated current collector is dried in an oven at 60° C. for 20 min to 2 h; and then the coated current collector is dried in a vacuum oven at 60-120° C. for 24 h to obtain an electrode sheet.

The electrode material is cathode active material or anode active material, wherein the cathode active material is one or more of lithium cobalt oxide, lithium iron phosphate, lithium manganese phosphate, lithium manganate, lithium nickel manganese oxide, lithium-rich manganese, ternary material, sulfur, sulfur complex, lithium iron sulfate, lithium ion fluorophosphate, lithium vanadium fluorophosphate, lithium iron fluorophosphate, lithium manganese oxide and conductive polymer, and preferably ternary material or sulfur.

The anode active material is one or more of lithium metal alloy, graphite, hard carbon, molybdenum disulfide, lithium titanate, carbon silicon composite material, carbon germanium composite material, carbon tin composite material, antimony oxide, antimony carbon composite material, tin antimony composite material, lithium titanium oxide and lithium metal nitride; and the conductive agent comprises one or more of graphite, Super P, KS6 graphite, Ketjen Black and acetylene black, and preferably is lithium titanate or carbon silicon composite material.

The organic solvent comprises one or more of dichloromethane, chloroform, 1,4-dioxane, dimethoxyethane, acetone, acetonitrile, dimethyl sulfoxide, sulfolane, dimethyl sulfite, diethyl sulfite, tetrahydrofuran, 1,2-dichloroethane, ethyl acetate, N-methylpyrrolidone, N,N-dimethylformamide and N,N-dimethylacetamide, wherein the organic solvent accounts for 10-80% of the total weight of the slurry, and preferably 20-50%.

The conductive current collector comprises one of copper foil, aluminum foil, titanium foil, stainless steel, carbon paper, foamed nickel, copper mesh and aluminum mesh, and preferably aluminum foil or copper foil.

The present invention has the following advantages:
The binder of the present invention is prepared by the ring-opening and cross-linking reaction of the polyvinylene carbonate and the nucleophile under mild conditions to produce a polymer with abundant hydroxyl groups. The polymer is a polymer system with dense polar functional groups (similar to polysaccharide structure) obtained through simple structural modification, and is suitable for binder systems of multiple electrode materials. Specifically:

1. The polymer skeleton of the present invention is similar to the polysaccharide structure and has highly dense functional groups, which is beneficial to provide higher bonding performance and optimization space.

2. The polymer binder of the present invention has high peel strength (0.02-0.6 N/mm), can avoid the peeling of electrode films during cycling, and has high elastic modulus thus can adapt to the volume expansion during charging and discharging of the electrode.

3. The polymer binder of the present invention can coordinate with polysulfide to inhibit the shuttle effect of the polysulfide in lithium-sulfur batteries.

4. The polymer binder of the present invention can chelate with transition metal ions, so as to stabilize high-voltage cathode active material, which is beneficial to the cycling stability of high-voltage batteries.

5. The polymer binder of the present invention can be prepared by a one-pot method by in-situ preparation, and active material particles are coated inside the polymer skeleton to provide high bonding performance. The synthesis steps are simple and the raw materials are easily available.

6. The polymer binder of the present invention has novel structure, excellent performance, strong innovation and wide application prospects (which can be applied to high-voltage lithium batteries, the lithium-sulfur batteries and other secondary high power lithium batteries).

DETAILED DESCRIPTION

Detailed description of the present invention is further illustrated below in combination with examples. It shall be noted that the detailed description described herein is only used to illustrate and explain the present invention, not limited to the present invention.

Embodiment 1

Preparation of Polymer Binder A1:
The cathode active material lithium nickel manganese oxide, Super P and binder A1 precursor

[(Nu1

(m=44, which accounted for 60% of the total mass of the polymer) and polyvinylene carbonate (which accounted for 40% of the total mass of the polymer)] were added into a mortar according to a mass ratio of 8:1:1 as slurry; NMP was added (which had a mass ratio of 10% in the slurry); and the mixture was continuously ground and stirred at 30° C. for 20 min to obtain uniform slurry. The above slurry was evenly coated on an aluminum foil, dried in an oven at 60° C. for 2 h, punched into an electrode sheet with appropriate size through a punching machine, dried in the oven at 100° C. for 24 h, and placed in a glove box for later use.

Figure 1:
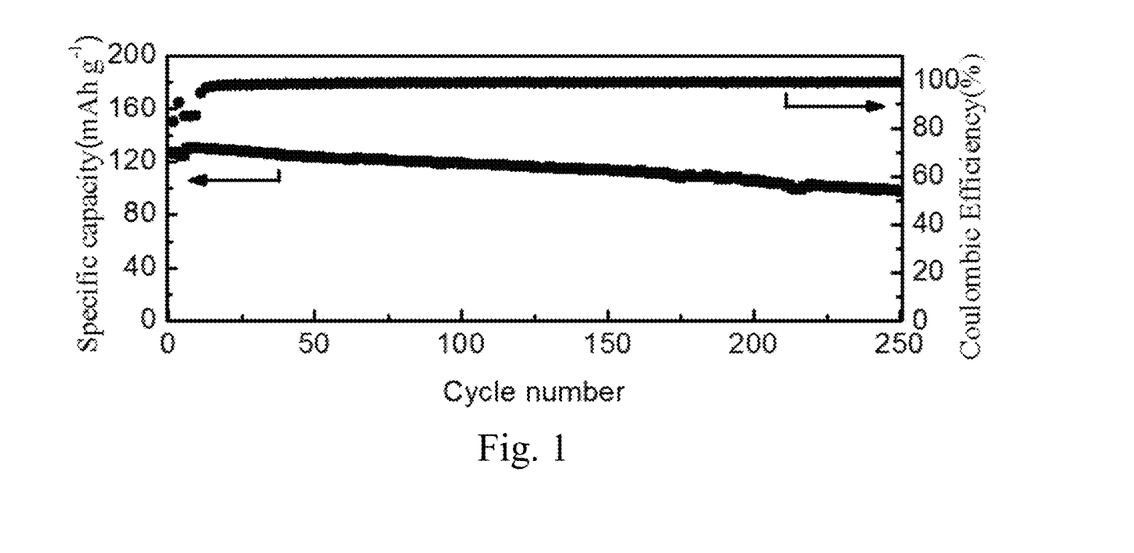
FIG. 1 shows long cycling performance of a battery assembled with electrodes at room temperature and 0.5 C in embodiment 1 provided by embodiments of the present invention.

The electrode obtained above was used as a cathode and graphite was used as an anode for assembling a lithium nickel manganese oxide//graphite full battery. The peel strength of the cathode and long cycling performance of the battery at room temperature and 0.5 C were detected (see FIG. 1 and Table 1). It can be seen from FIG. 1 that after cycling for 250 cycles under charging and discharging at 0.5 C, the capacity retention was 75%.

TABLE 1

| Component | Polyvinylene carbonate P1 | Nucleophile Nu1 | Cathode active material Lithium nickel manganese oxide | Conductive agent Super P | Electrolyte | Anode active material | Peeling strength (N/mm) |
|---|---|---|---|---|---|---|---|
| Mass fraction | 4% | 6% | 80% | 10% | 1M LiTFSI in DME | Graphite | 0.20 |

It can be seen from above results that the polymer binder has high peel strength and excellent electrochemical performance, which can be attributed to the abundant polar functional groups and rigid cross-linked skeleton structure of the binder.

Embodiment 2

Preparation of Polymer Binder A2:

Nu2

(which accounted for 10% of the total mass of the polymer) and polyvinylene carbonate (which accounted for 90% of the total mass of the polymer) were dissolved in acetonitrile (which had a mass ratio of 80% in the slurry), and stirred at 100° C. for 2 h to prepare a solution of polymer binder A2.

Polymer Binder A2 Based Electrodes with High Peel Strength:

The cathode active material sulfur, graphite and the acetonitrile solution of the polymer binder A2 obtained above were ground and stirred in the mortar according to a mass ratio of 70:5:25 to obtain uniform slurry. The above slurry was evenly coated on an aluminum foil, and dried in an oven at 60° C. for 0.5 h. The coated aluminum foil was punched into an electrode sheet with appropriate size through a punching machine, and dried in the oven at 80° C. for 12 h.

Figure 2:
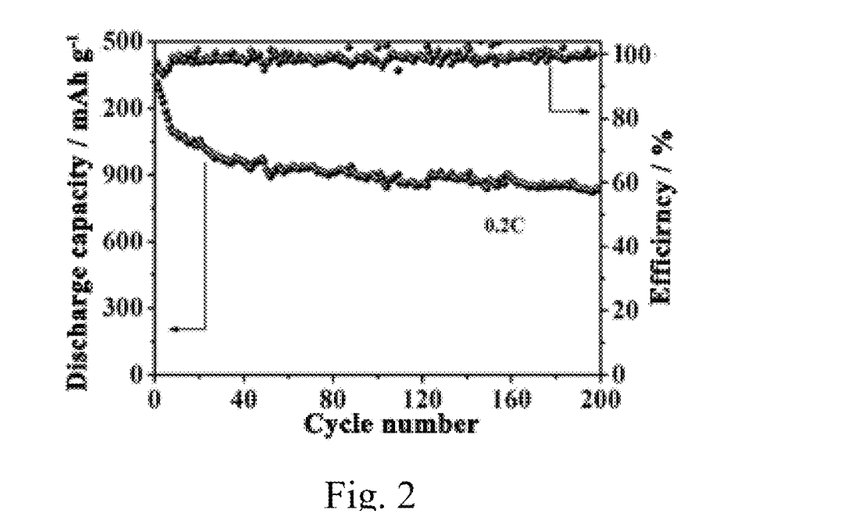
FIG. 2 shows long cycling performance of a battery assembled with electrodes at room temperature and 0.2 C in embodiment 2 provided by embodiments of the present invention.

The electrode obtained above was used as a cathode and lithium was used as an anode for assembling a sulfur// lithium full battery. The peel strength of sulfur electrodes and the long-term cycling performance of the battery at room temperature and 0.2 C were detected (see FIG. 2 and Table 2). It can be seen from FIG. 2 that after cycling for 200 cycles under charging and discharging at 0.2 C, the specific discharge capacity still kept at 891 mAh/g and coulombic efficiency was 99%.

It can be seen from above results that the polymer binder has high peel strength and excellent electrochemical performance because the binder has abundant polar functional groups and three-dimensional rigid cross-linked skeleton structure providing better bonding performance and mechanical properties.

Embodiment 3

Preparation of Polymer Binder A3:

Nu3 with structure (which accounted for 33% of the total mass of the polymer) and polyvinylene carbonate (which accounted for 67% of the total mass of the polymer) were dissolved in tetrahydrofuran (which had a mass ratio of 80% in the slurry), and stirred at −10° C. for 2 min to prepare a solution of polymer binder A2.

Polymer Binder A3 Based Electrodes with High Peel Strength:

Ternary cathode material, acetylene black and the tetrahydrofuran solution of the polymer binder A3 obtained above were ground and stirred in the mortar according to a mass ratio of 6.5:1.8:1.7 to obtain uniform slurry. The above slurry was evenly coated on an aluminum foil, and dried in an oven at 60° C. for 20 min. The coated aluminum foil was punched into an electrode sheet with appropriate size through a punching machine, dried in a vacuum oven at 60° C. for 12 h and placed in a glove box for later use.

Figure 3:
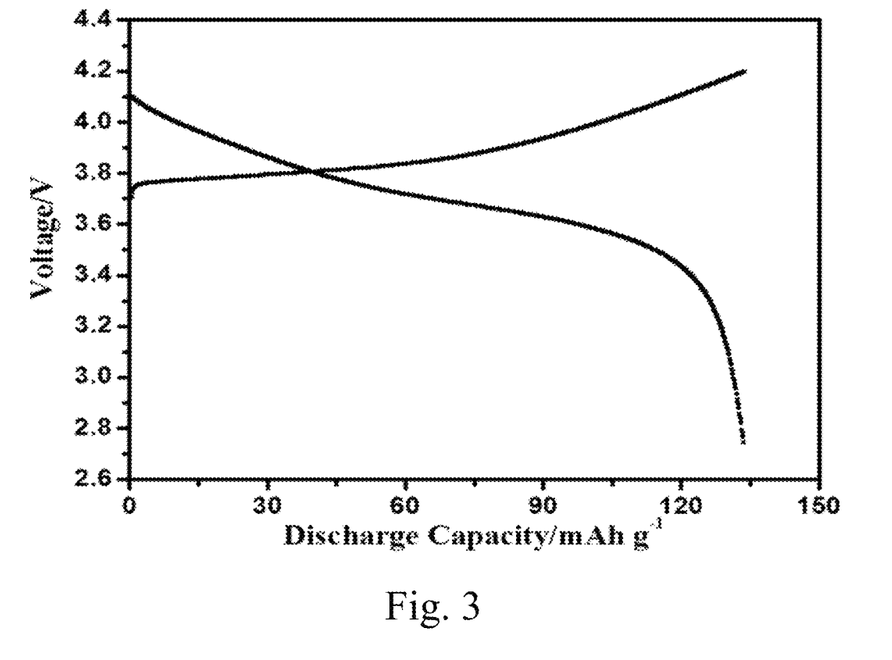
FIG. 3 is a charging and discharging curve of the 100th cycle of a battery assembled with electrodes at room temperature and 0.1 C in embodiment 3 provided by embodiments of the present invention.

The electrode obtained above was used as a cathode and lithium was used as an anode for assembling a ternary material (622 type)/lithium battery. The peel strength of ternary electrodes and the charging and discharging curve of the battery at room temperature were detected (see FIG. 3 and Table 3). It can be seen from FIG. 3 that after cycling for 100 cycles at room temperature and 1 C, the assembled electrode still maintained a specific discharge capacity of 134 mAh/g.

TABLE 2

| Component | Polyvinylene carbonate P1 | Nucleophile Nu2 | Cathode active material Sulfur | Conductive agent Graphite | Electrolyte | Anode active material | Peeling strength (N/nm) |
| --- | --- | --- | --- | --- | --- | --- | --- |
| Mass fraction | 22.5% | 2.5% | 70% | 5% | 1M LiTFSI in DME | Lithium | 0.02 |

TABLE 3

| Component | Polyvinylene carbonate P1 | Nucleophile Nu3 | Cathode active material Ternary material (622 type) | Conductive agent Acetylene black | Electrolyte | Anode active material | Peeling strength (N/mm) |
|---|---|---|---|---|---|---|---|
| Mass fraction | 12% | 6% | 65% | 17% | 1M LiDFOB in DMC | Lithium | 0.15 |

It can be seen from above results that the excellent electrochemical performance of the polymer binder in the ternary cathode-based lithium battery results from the introduction of ionic liquid structural units, thereby improving ionic conductivity and oxidation stability.

Embodiment 4

Polymer Binder A4 Based Electrodes with High Peel Strength:

The cathode active material silicon carbon, KS6 graphite and binder A4 precursor [Nu4

(m=10, which accounted for 90% of the total mass of the polymer) and polyvinylene carbonate (which accounted for 10% of the total mass of the polymer)] were added into the mortar according to a mass ratio of 50:25:25 as slurry; DMF (which had a mass ratio of 65% in the slurry) was added; and the mixture was continuously ground and stirred at 80° C. for 1 h to obtain uniform slurry. The above slurry was evenly coated on an aluminum foil, and dried in an oven at 60° C. for 2 h. The coated aluminum foil was punched into an electrode sheet with appropriate size through a punching machine, dried in a vacuum oven at 120° C. for 18 h and placed in a glove box for later use.

Figure 4:
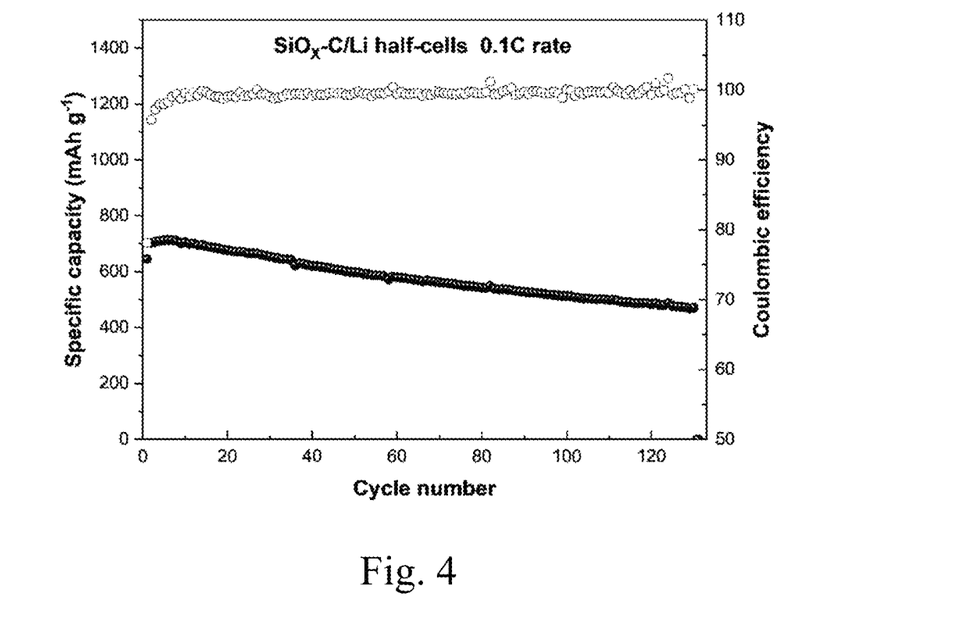
FIG. 4 shows long cycling performance of a battery assembled with electrodes at room temperature and 0.1 C in embodiment 4 provided by embodiments of the present invention.

The electrode obtained above was used as a cathode and lithium was used as an anode for assembling a half battery. The peel strength of silicon/carbon electrodes and the long-term cycling performance of the assembled battery at room temperature and 0.1 C were detected (see FIG. 4 and Table 4). It can be seen from FIG. 4 that after cycling for 130 cycles under charging and discharging at 0.1 C, the assembled battery still maintained a specific discharge capacity of 500 mAh/g.

It can be seen from above results that high peeling property of the polymer binder that originates from abundant polar functional groups and cross-linked network skeleton structure of the polymer endows as-prepared batteries with superior electrochemical performance.

Embodiment 5

Polymer Binder A5 Based Electrodes with High Peel Strength:

Nano sulfur, acetylene black and polymer binder A5 precursor [Nu5

(m=10, which accounted for 50% of the total mass of the polymer) and polyvinylene carbonate (which accounted for 50% of the total mass of the polymer)] were mixed into the mortar according to a mass ratio of 90:5:5 as slurry; dimethyl sulfoxide (which had a mass ratio of 50% in the slurry) was added; and the mixture was continuously ground and stirred at 40° C. for 10 min to obtain uniform slurry. The above slurry was evenly coated on an aluminum foil, and dried in an oven at 60° C. for 1 h. The coated aluminum foil was punched into an electrode sheet with appropriate size through a punching machine, dried in the oven at 100° C. for 10 h and placed in a glove box for later use.

Figure 5:
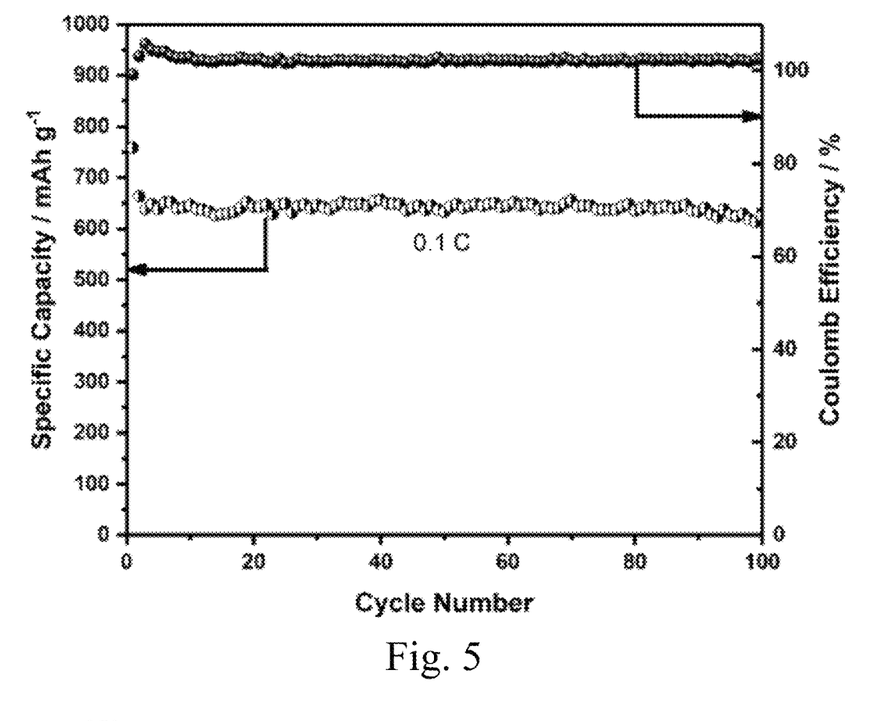
FIG. 5 shows long cycling performance of a battery assembled with electrodes at room temperature and 0.5 C in embodiment 5 provided by embodiments of the present invention.

The electrode obtained above was used as a cathode and lithium was used as an anode for assembling a lithium-sulfur battery. The peel strength of sulfur cathodes and the long-term cycling performance of the assembled battery at room temperature and 0.1 C were detected (see FIG. 5 and Table 5). It can be seen from FIG. 5 that after cycling for 100 cycles under charging and discharging at 0.1 C, the assembled battery still kept a specific discharge capacity of 600 mAh/g.

TABLE 4

| Component | Polyvinylene carbonate P1 | Nucleophile Nu4 | Cathode active material Silicon carbon | Conductive agent KS6 graphite | Electrolyte | Anode active material | Peeling strength (N/mm) |
|---|---|---|---|---|---|---|---|
| Mass fraction | 2.5% | 22.5% | 50% | 25% | 1M LiBOB in EC | Lithium | 0.45 |

TABLE 5

| Component | Polyvinylene carbonate P1 | Nucleophile Nu5 | Cathode active material Nano sulfur | Conductive agent Acetylene black | Electrolyte | Anode active material | Peeling strength (N/mm) |
|---|---|---|---|---|---|---|---|
| Mass fraction | 2.5% | 2.5% | 90% | 5% | 1M LiPF$_6$ in DMC | Lithium | 0.5 |

It can be seen from above results that high peeling property of the polymer binder that results from the polymer skeleton of the 3D network structure and abundant polar functional groups renders high battery performance.

Embodiment 6

Polymer Binder A6 Based Electrodes with High Peel Strength:

The cathode active material lithium cobalt oxide, Ketjen Black and polymer binder A6 precursor (Nu6 glucosamine accounted for 60% of the total mass of the polymer and polyvinylene carbonate accounted for 40% of the total mass of the polymer) were added into the mortar according to a mass ratio of 8:1:1 as slurry; NMP (which had a mass ratio of 45% in the slurry) was added; and the mixture was ground and stirred at 0° C. for 5 min to obtain uniform slurry. The above slurry was evenly coated on an aluminum foil, and dried in an oven at 60° C. for 2 h. The coated aluminum foil was punched into an electrode sheet with appropriate size through a punching machine, and then dried in the vacuum oven at 110° C. for 12 h.

Figure 6:
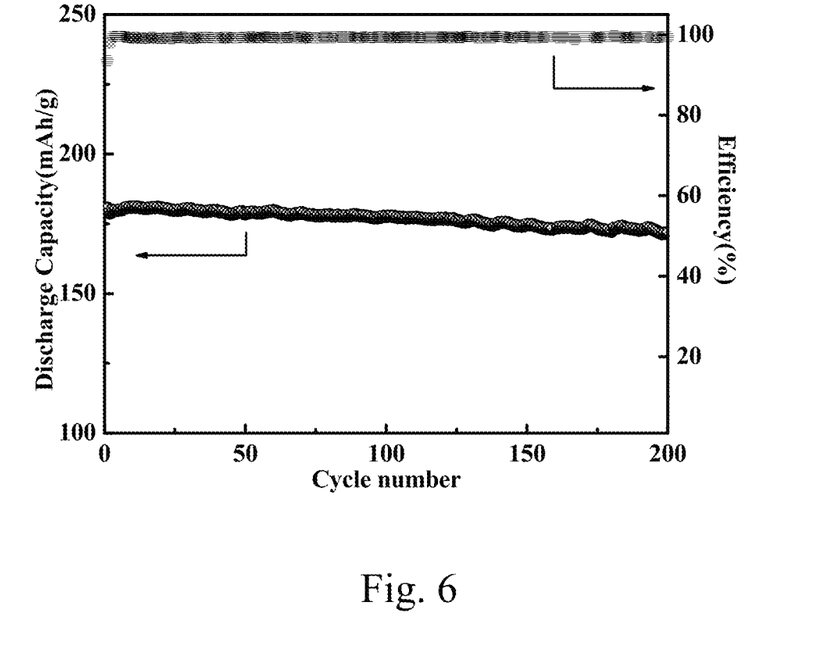
FIG. 6 shows long cycling performance of a battery assembled with electrodes at room temperature and 0.5 C in embodiment 6 provided by embodiments of the present invention.

The electrode obtained above was used as a cathode and lithium was used as an anode for assembling a lithium cobalt oxide/lithium battery. The peel strength of the cathodes and the charging and discharging curves of the battery at room temperature were detected (see FIG. 6 and Table 6). It can be seen from FIG. 6 that after cycling for 200 cycles under charging and discharging at 0.5 C, the capacity retention of the battery was 90% together with coulombic efficiency of 99%.

TABLE 6

| Component | Polyvinylene carbonate P1 | Nucleophile Nu6 | Cathode active material Lithium cobalt oxide | Conductive agent Ketjen Black | Electrolyte | Anode active material | Peeling strength (N/mm) |
|---|---|---|---|---|---|---|---|
| Mass fraction | 4% | 6% | 80% | 10% | 1M LiDFOB in DMC/EC (v/v = 1:1) | Lithium | 0.6 |

It can be seen from above results that high electrochemical performance of the polymer binder indicates that the polyvinylene carbonate binder derived from saccharides possesses high application potential.

The test of the battery performance in above various embodiments comprises the following steps:

(1) Battery Assembly

A corresponding half-cell or battery structure was put into a battery case and the battery case was sealed to obtain a battery.

(2) Test of Battery Performance

The long-term cycling performance and rate performance of the secondary lithium battery were tested with a LAND battery charging and discharging instrument. The electrochemical performance of the electrolyte was tested with an electrochemical workstation.

The invention claimed is:

1. A polymer binder obtained by a ring-opening reaction of polyvinylene carbonate by a nucleophile, wherein the polyvinylene carbonate accounts for 10-90% of a total mass of the polymer binder and the nucleophile accounts for 10-90% of the total mass of the polymer binder, and the nucleophiles is one or more compound selected from glucosamine, chitosan, amino acid, -continued compound, wherein n is 1-2, and m is 0-200; X is selected from O, S, and NH, Y is selected from PF6⁻, BF4⁻, TFSI⁻, FSI⁻ or CH3OSO3⁻, and R1 is selected from H, Me or Et.

2. The polymer binder according to claim 1, wherein the ring-opening reaction is carried out at −10 to 100° C.

3. An electrode of a secondary lithium battery comprising an electrode active material, the polymer binder of claim 1, and a conductive agent, wherein a mass fraction of the electrode active material in the electrode is 50-95%, a mass fraction of the polymer binder in the electrode is 5-25%, and a mass fraction of the conductive agent in the electrode is 5-25%.

4. A preparation method for the electrode of claim 3, comprising:
   mixing the active material, the polyvinylene carbonate, the nucleophile, and a conductive agent in an organic solvent at −10 to 100° C. for 2 min to 2 h to obtain a slurry;
   coating the slurry on a conductive current collector;
   drying the coated current collector at 60° C. for 20 min to 2 h; and
   drying the coated current collector is in a vacuum oven at 60-120° C. for 24 h to obtain the electrode.

5. The preparation method according to claim 4, wherein the electrode material is cathode active material or anode active material, wherein the cathode active material is one or more selected from lithium cobalt oxide, lithium iron phosphate, lithium manganese phosphate, lithium manganate, lithium nickel manganese oxide, lithium-rich manganese, ternary material, sulfur, sulfur complex, lithium iron sulfate, lithium ion fluorophosphate, lithium vanadium fluorophosphate, lithium iron fluorophosphate, lithium manganese oxide, and conductive polymer,
   wherein the anode active material is one or more selected from lithium metal alloy, graphite, hard carbon, molybdenum disulfide, lithium titanate, carbon silicon composite material, carbon germanium composite material, carbon tin composite material, antimony oxide, antimony carbon composite material, tin antimony composite material, lithium titanium oxide and lithium metal nitride; and the conductive agent comprises one or more of graphite, Super P, KS6 graphite, Ketjen Black, and acetylene black.

6. The preparation method according to claim 4, wherein the organic solvent comprises one or more selected from dichloromethane, chloroform, 1,4-dioxane, dimethoxyethane, acetone, acetonitrile, dimethyl sulfoxide, sulfolane, dimethyl sulfite, diethyl sulfite, tetrahydrofuran, 1,2-dichloroethane, ethyl acetate, N-methylpyrrolidone, N,N-dimethylformamide, and N,N-dimethylacetamide,
   the organic solvent accounts for 10-80% of a total weight of the slurry, and
   the conductive current collector is selected from copper foil, aluminum foil, titanium foil, stainless steel, carbon paper, foamed nickel, copper mesh, and aluminum mesh.

7. A preparation method for the electrode of claim 3, comprising dissolving the polyvinylene carbonate and the nucleophile in an organic solvent and carrying out a reaction at −10 to 100° C. for 2 min to 2 h to obtain a reaction mixture;
   mixing the conductive agent with the reaction mixture to obtain a slurry;
   coating the slurry on a conductive current collector;
   drying the coated current collector at 60° C. for 20 min to 2 h; and
   drying the coated current collector in a vacuum oven at 60-120° C. for 24 h to obtain the electrode.

* * * * *